(12) United States Patent
Lee et al.

(10) Patent No.: US 6,980,264 B2
(45) Date of Patent: Dec. 27, 2005

(54) REPAIR METHOD FOR DEFECTS IN DATA LINES AND FLAT PANEL DISPLAY INCORPORATING THE SAME

(75) Inventors: Ju-Long Lee, Hsinchu (TW); Yi-Hsiang Lin, Taipei (TW)

(73) Assignee: Au Optronics Corp., Hsinchu (TW)

( * ) Notice: Subject to any disclaimer, the term of this patent is extended or adjusted under 35 U.S.C. 154(b) by 13 days.

(21) Appl. No.: 10/735,803

(22) Filed: Dec. 12, 2003

(65) Prior Publication Data

US 2004/0169781 A1    Sep. 2, 2004

(30) Foreign Application Priority Data

Feb. 18, 2003    (TW) ............................... 92103274 A

(51) Int. Cl.⁷ ........................................... G02F 1/1343

(52) U.S. Cl. ......................... 349/54; 349/55; 349/192

(58) Field of Search ............................. 349/54–55, 192

(56) References Cited

U.S. PATENT DOCUMENTS 6,628,368 B2 *   9/2003   Yang ........................... 349/192
2002/0054248 A1 *   5/2002   Cheng et al. .................. 349/54

* cited by examiner

Primary Examiner—Dung T. Ngu
Assistant Examiner—Phu Vu
(74) Attorney, Agent, or Firm—Ladas & Parry LLP

(57) ABSTRACT

A method of repairing data line defects and flat panel display incorporating the same. The shielding metal lines are disposed beside the data lines and the backup wires are across the adjacent data lines/shielding metal lines to repair disconnection defects in data lines. If several defects occur in the same data line, each defect can be repaired by laser fusing using the adjacent, suitable shielding metal line and the corresponding backup wires to detour around the defect to create an electrical loop. The flat panel display further comprises the shielding metal lines disposed beside the gate lines and the backup wires across the adjacent gate lines/shielding metal lines to repair disconnection defects in gate lines.

18 Claims, 16 Drawing Sheets

REPAIR METHOD FOR DEFECTS IN DATA LINES AND FLAT PANEL DISPLAY INCORPORATING THE SAME

BACKGROUND OF THE INVENTION

1. Field of the Invention

The present invention relates in general to a method for repairing conducting line defects. In particular, the present invention relates to a method for repairing data line defects and gate line defects in a flat panel display (FPD).

2. Description of the Related Art

Liquid crystal displays (LCDs) are a well-known form of flat panel displays with advantages of low power consumption, light weight, thin profile, and low driving voltage. The liquid crystal molecules change orientation when an electronic field is applied. In the display region of the LCD, an array of pixel regions is patterned by horizontally extending gate lines and vertically extending data lines. Each pixel region has a thin film transistor (TFT) and a pixel electrode. The TFT serves as a switching device.

As described above, the TFT array substrate has wiring patterns such as the gate lines and data lines, that supply image signals to drive the pixel electrodes. However, the wiring patterns may easily disconnect if the regions they pass are not smooth or during heat treatments or etching processes, resulting in open or short circuits. As size and resolution of LCD devices continue to increase, large numbers of data lines and gate lines with a narrower line width are required on the TFT array substrate. Fabricating difficulties are also increased, causing higher likelihood of broken wiring patterns. Accordingly, it is desirable to provide a repair method that allows the LCD to operate despite broken wiring.

FIG. 1 is a top view of a conventional repair method for disconnected data lines. On a TFT array substrate 10 of an LCD, a display region 20 has a plurality of horizontally extending gate lines 12 and a plurality of vertically extending data lines 16 to form an array of rectangular pixel regions 22. The TFT array substrate 10 also includes a plurality of gate pads 14 at an end of each gate line 12, and a plurality of data pads 18 at an end of each data line 16. In addition, a plurality of repair lines 24A, 24B and 24C are formed to cross the data lines 16 outside the display region 20.

For example, when a broken point A interrupts the passage of image signals through the broken data line 16A, laser fusing or other conventional techniques can be used to connect points 26a and 26b where the broken data line 16A meets the repair line 24A, and the repair line 24A is cut off at positions 28a and 28b. Thus, image signals can pass through the repair line 24A to reach the broken point A. Capacitors between the repair line 24A and the data line 16A, causing image signal distortion at the intersecting point 26a or 26b when passing through the repair line 24A. Particularly, as the number of data lines 16 increases, the number of intersecting points also increases, and the increased capacitor count worsens the signal quality. Moreover, depending on the location of the broken data line, a large delay may be incurred due to the resistance and capacitance of the repair line between opposite ends of the broken data line. This increased delay may be unacceptable for large, high-resolution LCD devices. In addition, a single data line is generally repaired using a single repair line and the number of repair lines 24 is limited by the size of the display region 20. Thus, a repair method for the broken data lines without fabricating repair lines, to solve the aforementioned problems, is called for.

SUMMARY OF THE INVENTION

To solve the above problems, it is an object of the present invention to provide a repair method for defective data lines using shielding metal lines disposed in each pixel without setting additional repair lines outside the display region, such that the repairable number of defective wiring lines is not limited. The repair method is not only suitable for data lines, but also for gate lines.

The present invention also provides a flat panel display incorporating the repair method for defects in data lines. A first shielding metal line is disposed between a pixel electrode and a data line in each pixel region. The first shielding metal lines in different pixel regions or near different data lines are isolated from the others. A first backup wire is set across the adjacent first shielding metal line and the data line. Each first shielding metal line has at least two corresponding first backup wires isolated from the shielding metal line of the data line.

The first backup wire can extend from the data line or the first shielding metal line or be an independent wire separated from the data line and the first shielding metal line.

If the first backup wire extends from the data line, the overlap point of the first backup wire and the first shielding metal line is a repair point. The first shielding metal line and the gate line are formed from the first metal layer, that is, M1, and the first backup wire and the data line are formed from the second metal layer, that is, M2. Alternatively, the first backup wire and the data line are formed from M1, and the first shielding metal line and the gate line are formed from M2.

If the first backup wire extends from the first shielding metal line, the overlap point of the first backup wire and the data line is a repair point. The first backup wire, the first shielding metal line and the gate line are formed from M1, and the data line is formed from M2. Alternatively, the data line is formed from M1, and the first backup wire, the first shielding metal line and the gate line are formed from M2.

If the first backup wire is an independent wire separated from the data line and the first shielding metal line, the overlap points of the first backup wire, the data line and the first shielding metal line are repair points. The first backup wire and the gate line are formed from M1, and the first shielding metal line and the data line are formed from M2. Alternatively, the first shielding metal line and the data line are formed from M1, and the first backup wire and the gate line are formed from M2.

The flat panel display in this invention may further comprise a structure capable of repairing defects of gate lines. A second shielding metal line is disposed between the pixel electrode and the gate line in each pixel region. The second shielding metal lines in different pixel regions or near different gate lines are isolated from the others. A second backup wire is set across the adjacent second shielding metal line and the gate line. Each second shielding metal line has at least two corresponding second backup wires isolated from the shielding metal line of the gate line.

The second backup wire can extend from the gate line or the second shielding metal line or be an independent wire separated from the gate line and the second shielding metal line.

If the second backup wire extends from the gate line, the overlap point of the second backup wire and the second shielding metal line is a repair point.

If the second backup wire extends from the second shielding metal line, the overlap point of the second backup wire and the gate line is a repair point.

If the second backup wire is an independent wire separated from the gate line and the second shielding metal line, the overlap points of the second backup wire, the gate line and the second shielding metal line are repair points.

When a data line has a defect, such as disconnection, the first shielding metal line adjacent to the defect and the corresponding first backup wires on both sides of the defect are chosen for short-circuit at the repair points. Thus, the image signals can pass through the defective date line by detouring around the defect region.

When a gate line has defect, such as disconnection, the second shielding metal line adjacent to the defect and the corresponding second backup wires on both sides of the defect are chose for short-circuit at the repair points. Thus, the image signals can pass through the defective gate line by detouring around the defect region.

BRIEF DESCRIPTION OF THE DRAWINGS

The preferred embodiment of the invention is hereinafter described with reference to the accompanying drawings in which.

DETAILED DESCRIPTION OF THE INVENTION

After an active matrix substrate is fabricated and before assembly with another substrate, it is checked for defects, such as disconnection, in the gate lines or data lines. If disconnection defects are found on a data line, the date line is then repaired using the adjacent shielding metal line and backup wires so that the image signal can pass through the data line by detouring around the defect region.

Figure 1:
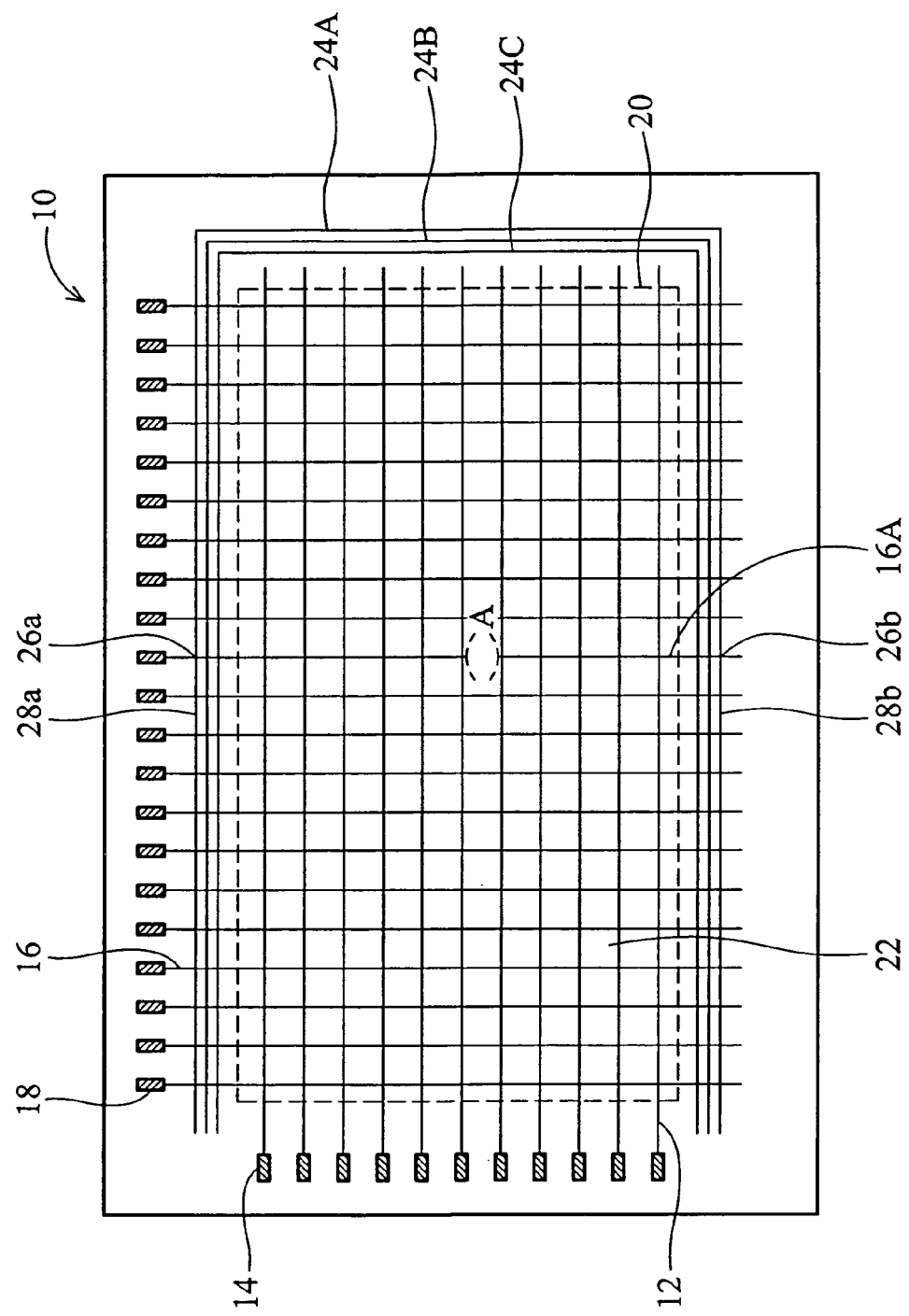
FIG. 1 is a top view of a conventional repair method for the disconnected data lines.
Figure 2:
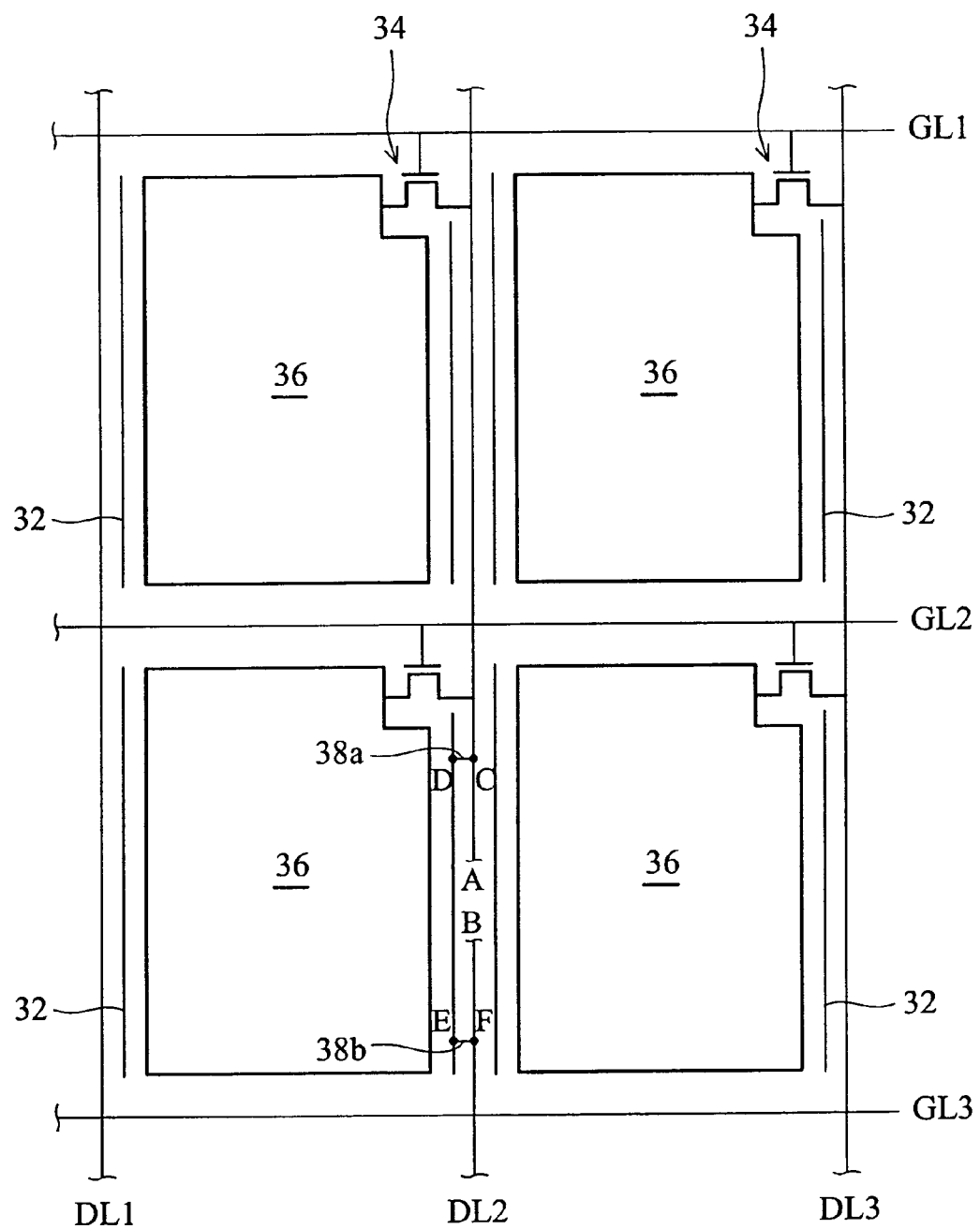
FIG. 2 is an equivalent circuit showing the repair method for disconnection defects in the data line.

Disconnection Defect Repair in the Data Line:

FIG. 2 is an equivalent circuit showing the repair method for disconnection defect in the data line. The matrix substrate 30 of the liquid crystal display comprises a plurality of gate lines $GL_1$, $GL_2$ and $GL_3$ and data lines $DL_1$, $DL_2$ and $DL_3$. The gate lines $GL_1$, $GL_2$ and $GL_3$ and the data lines $DL_1$, $DL_2$ and $DL_3$ are arranged in matrix, and pixel regions are surrounded thereby. Each pixel region includes a thin film transistor (TFT) 34 and a pixel electrode 36. A plurality of shielding metal lines 32 are disposed between the pixel electrodes 36 and the data lines $DL_1$, $DL_2$ and $DL_3$ for preventing light leakage, and each shielding metal line 32 is in a floating state.

After forming the active matrix substrate 30, a defect test is executed to find any defects in the data lines and the gate lines and ensure dislocation thereof. Then, the defect is repaired using the adjacent shielding metal line 32.

For example, if the disconnection defect occurs between terminal A and B in the data line $DL_2$, image signals cannot be transmitted in the data line $DL_2$. The repair method connects the data line $DL_2$ with the shielding metal line 32 via the wires 38a and 38b to detour around the defect region. Thus, the electrically connecting path through the points C D E F serves a repair line around the defect between the terminals A and B.

A detailed description of the repair method for disconnection defects is given in the following embodiments.

First Embodiment

Figure 3:
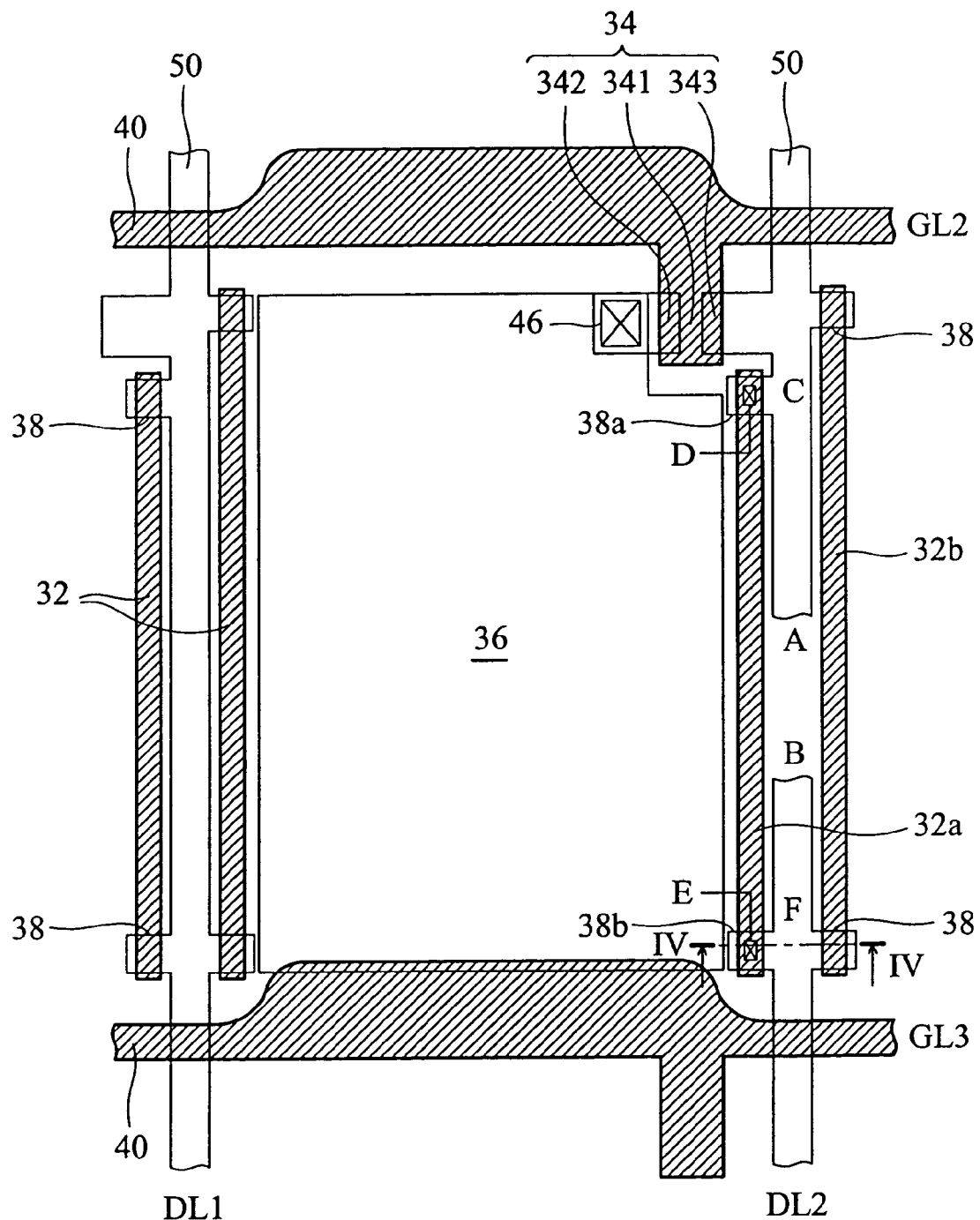
FIG. 3 is a top view of the pixel structure allowing repair of data line defects according to the first embodiment of the present invention.
Figure 4A:
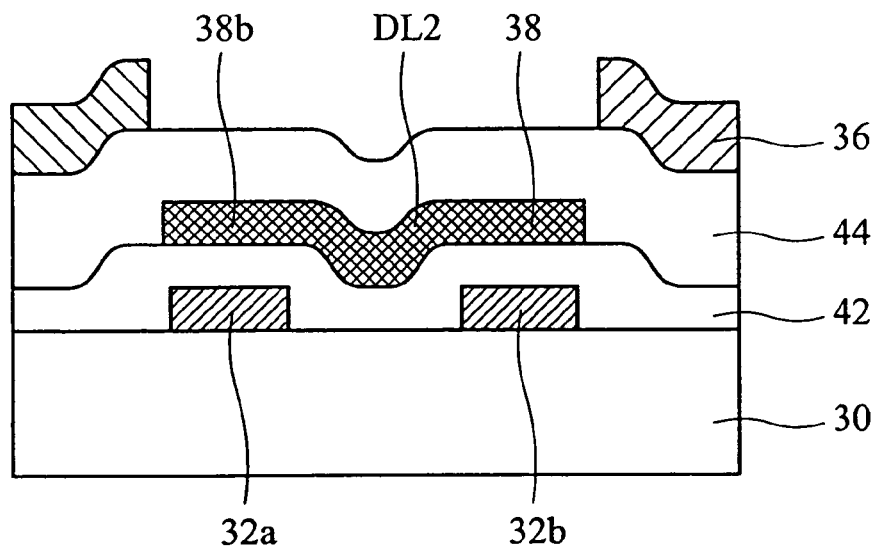
FIG. 4A is a cross section taken along cut line IV—IV of FIG. 3 before repair.
Figure 4B:
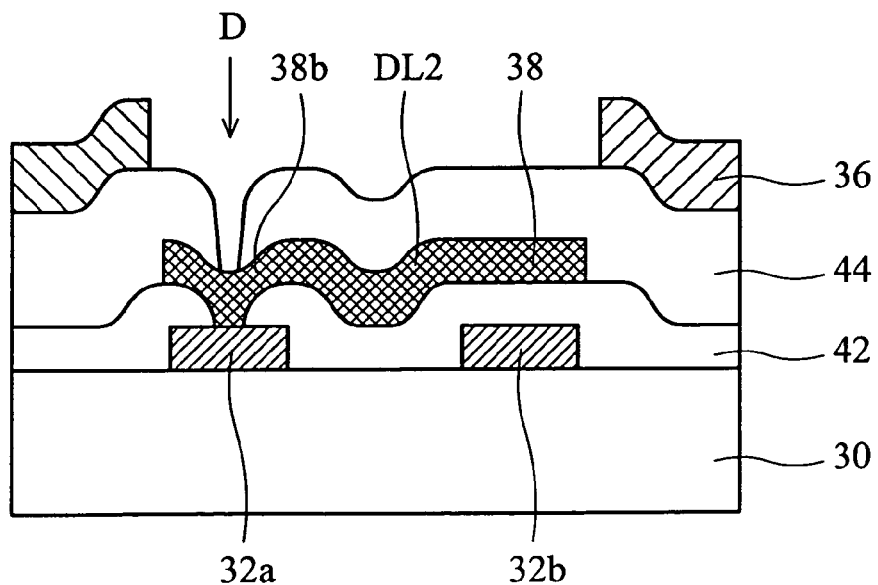
FIG. 4B is a cross section taken along cut line IV—IV of FIG. 3 after repair.

FIG. 3 is a top view of the pixel structure allowing repair of data line defects. FIG. 4A is a cross section taken along cut line IV—IV of FIG. 3 before repair, and FIG. 4B is a cross section taken along cut line IV—IV of FIG. 3 after repair.

As shown in FIGS. 3 and 4A, a first metal layer (M1) is formed on a substrate 30, and patterned to form two gate lines 40, a gate electrode 341 of the TFT structure 34, and shielding metal lines 32. The shielding metal lines 32 are disposed between the pixel electrode 36 and the data lines 50 to obstruct the light in the periphery of the pixel electrode 36 and between the pixel electrode 36 and the data lines 50, and the shielding metal lines 32 are floating. An insulating layer 42, at least one semiconductor layer (not shown) and a second metal layer (M2) are sequentially formed on the substrate 30 with the gate lines 40, the gate electrode 341 and the shielding metal lines 32 thereon. After defining the second metal layer (M2), a drain electrode 342, a source electrode 343, two data lines 50, and backup wires 38 are formed. In this embodiment, the backup wires 38 are protruding portions of the data lines 50. A passivation layer and a conducting layer, such as indium tin oxide (ITO), are sequentially formed on the substrate 30 with the drain electrode 302, the source electrode 303, the data lines 40 and the protruding portions 38 thereon, and the conducting layer is patterned to form a pixel electrode 36. The pixel electrode 36 electrically connects the drain electrode 342 through the contact hole 46. The active matrix substrate is thus substantially obtained.

For clear description, the shielding metal lines 32 adjacent to the defect in the data line $DL_2$ are referred to as 32a and 32b, and the protruding portions 38 for repair are referred to as 38a and 38b.

In order to ensure the fabrication quality of the active matrix substrate, disconnection defects in the data lines 50 are detected by, for example, observing the brightness of the pixel region 36. For example, the data line $DL_2$ between the gate lines $GL_2$ and $GL_3$ may be broken. To repair the broken data line $DL_2$, two nearby shielding metal lines 32a or/and 32b can be chosen. In this embodiment, the shielding metal line 32a is selected. Laser fusing is then executed on the repair points D and E to remove part of the insulating layer 42. Then, the protruding portions 38a and 38b on M2 are electrically connected to the shielding metal line 32a on M1, as shown in FIG. 4B. Thus, this segment of the data line $DL_2$ can be replaced by the local repair line composed of the protruding portion 38a, the shielding metal line 32a, and the protruding portion 38b, and the image signals can pass through the data line $DL_2$ by detouring around the broken terminals A and B.

In this embodiment, the shielding metal line 32 is fabricated with the gate 341 and the gate lines 40 and formed from M1. The backup wires 38 are fabricated with the data lines 50 and formed from M2. The backup wires 38 extend from the data lines 50, and laser fusing connects the backup wires 38 with the underlying shielding metal line 32 to form the repair line detouring around the disconnection defect.

Second Embodiment

Figure 5:
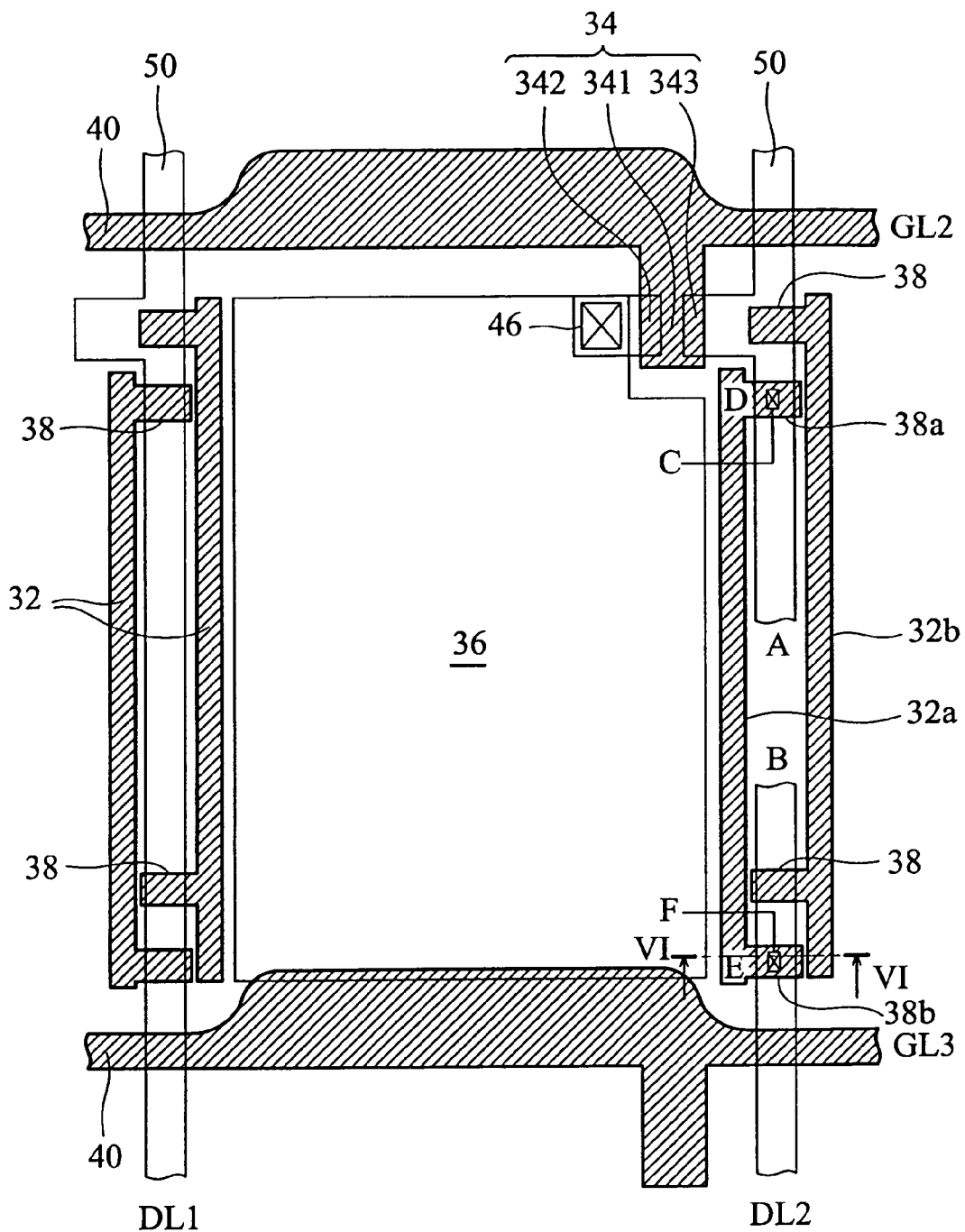
FIG. 5 is a top view of the pixel structure allowing repair of data line defects according to the second embodiment of the present invention.
Figure 6A:
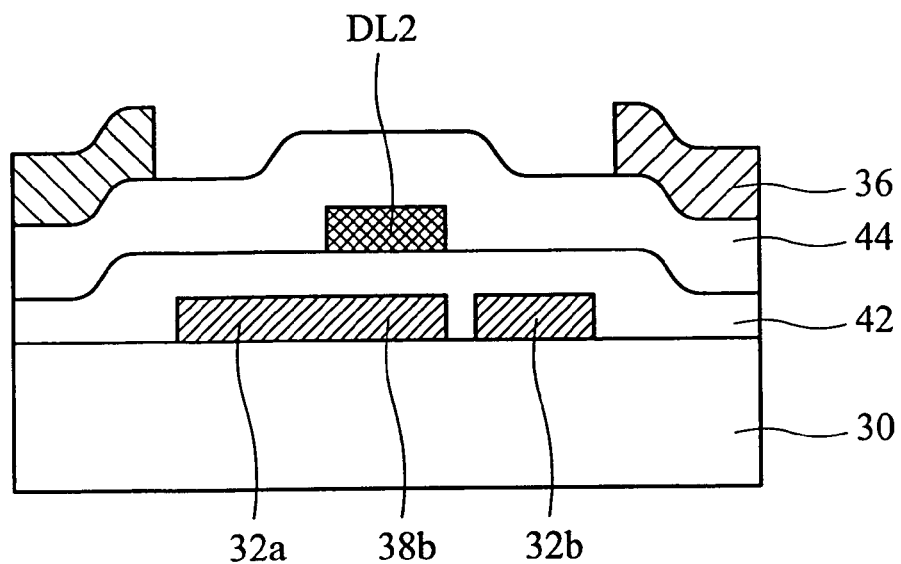
FIG. 6A is a cross section taken along cut line VI—VI of FIG. 5 before repair.
Figure 6B:
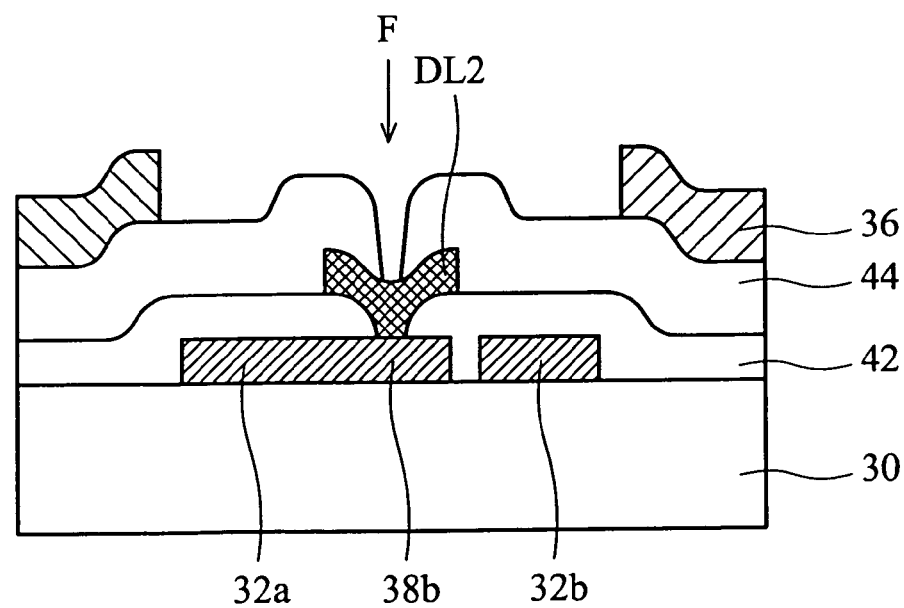
FIG. 6B is a cross section taken along cut line VI—VI of FIG. 5 after repair.

FIG. 5 is a top view of the pixel structure allowing repair of data line defects. FIG. 6A is a cross section taken along cut line VI—VI of FIG. 5 before repair, and FIG. 6B is a cross section taken along cut line VI—VI of FIG. 5 after repair.

In this embodiment, the fabrication process of the active matrix substrate is substantially the same as that of the first embodiment, with the difference being the location of the backup wires 38. In this embodiment, the backup wires 38, the shielding metal lines 32, the gate electrode 341 and the gate lines 40 are fabricated at the same time, and formed from M1. The data lines 50 are formed from M2. The backup wires 38 are the protruding portions of the shielding metal lines 32.

For clear description, the shielding metal lines 32 adjacent to the defect in the data line $DL_2$ are referred to as 32a and 32b, and the protruding portions 38 for repair are referred to as 38a and 38b.

In order to ensure the fabrication quality of the active matrix substrate, disconnection defects in the data lines 50 are detected by, for example, observing the brightness of the pixel region 36. For example, the data line $DL_2$ between the gate lines $GL_2$ and $GL_3$ may be broken. To repair the broken data line $DL_2$, two nearby shielding metal lines 32a or/and 32b can be chosen. In this embodiment, the shielding metal line 32a is selected. Laser fusing is then executed on the repair points C and F to remove part of the insulating layer 42. Then, the data line $DL_2$ on M2 is electrically connected to the backup wires 38a and 38b on M1, as shown in FIG. 6B. Thus, this segment of the data line $DL_2$ can be replaced by the local repair line composed of the backup wire 38a, the shielding metal line 32a and the backup wire 38b, and the image signals can pass through the data line $DL_2$ by detouring around the broken terminals A and B.

Third Embodiment

Figure 7:
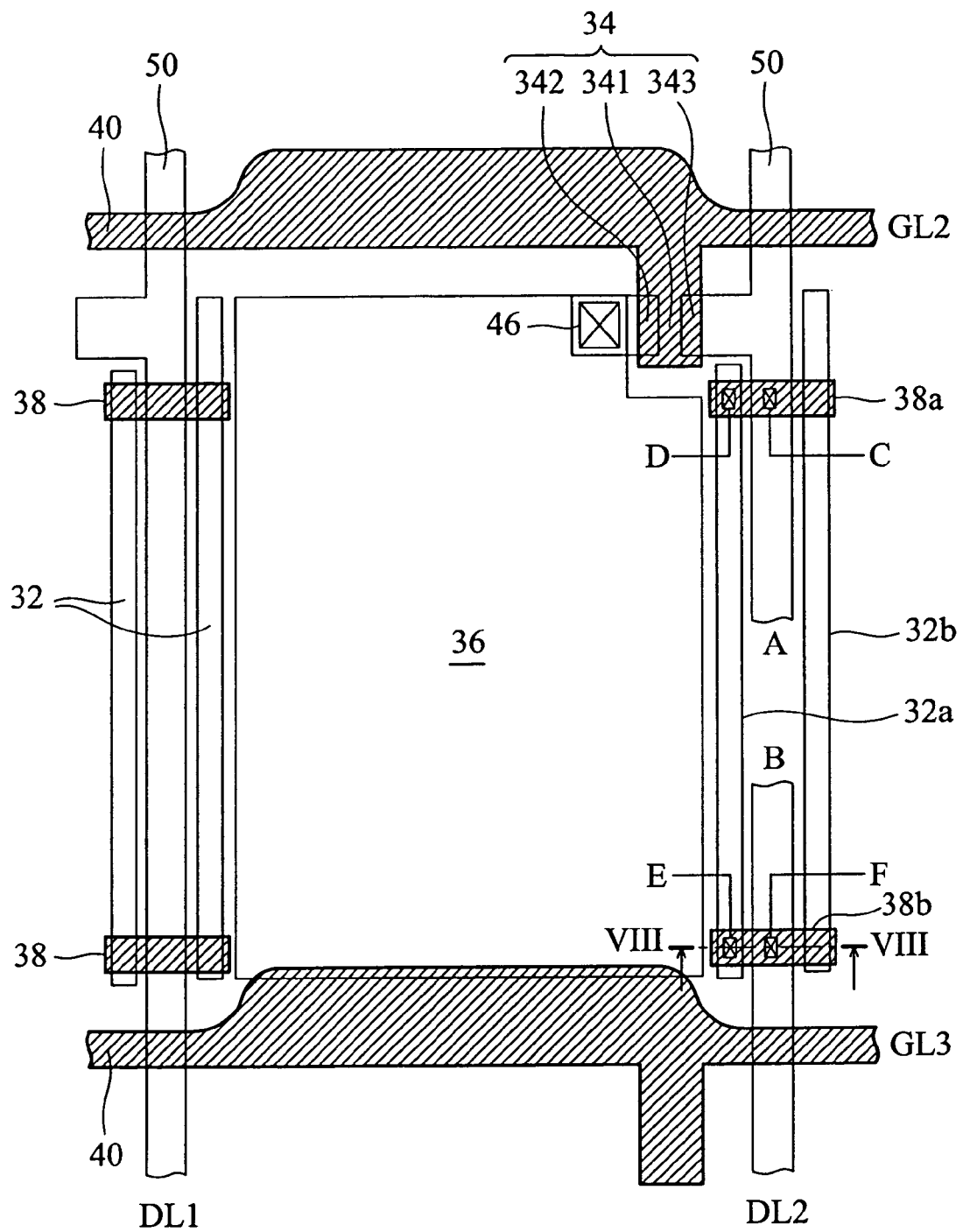
FIG. 7 is a top view of the pixel structure allowing repair of data line defects according to the third embodiment of the present invention.
Figure 8A:
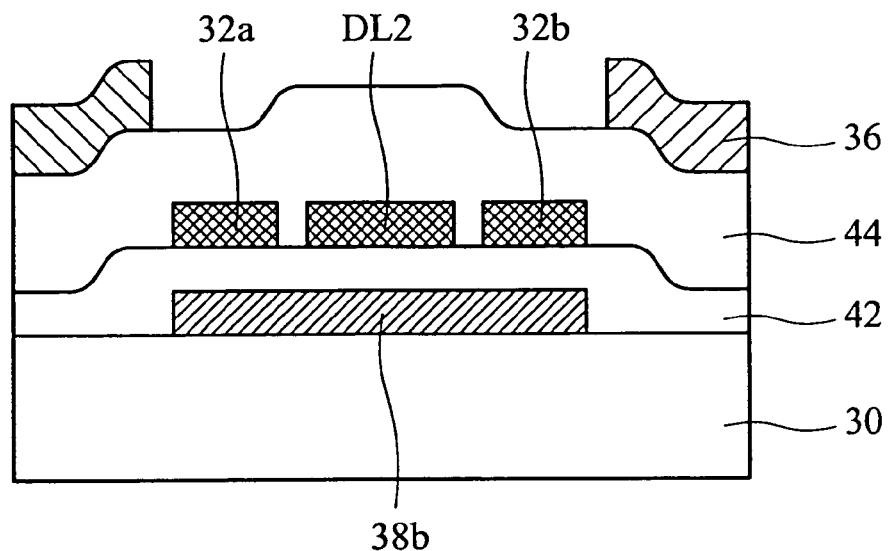
FIG. 8A is a cross section taken along cut line VIII—VIII of FIG. 7 before repair.
Figure 8B:
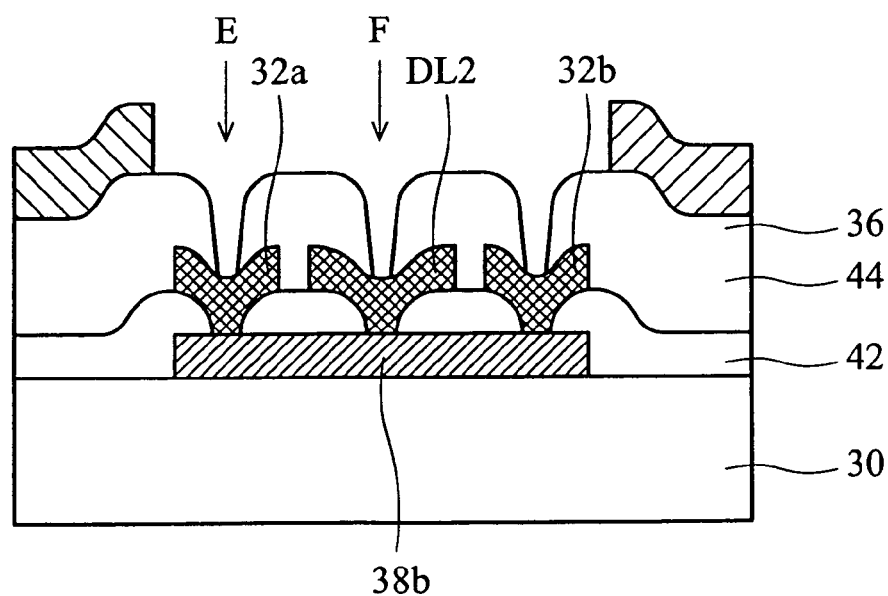
FIG. 8B is a cross section taken along cut line VIII—VIII of FIG. 7 after repair.

FIG. 7 is a top view of the pixel structure allowing repair of data line defects. FIG. 8A is a cross section taken along cut line VIII—VIII of FIG. 7 before repair, and FIG. 8B is a cross section taken along cut line VIII—VIII of FIG. 7 after repair.

In this embodiment, the fabrication process of the active matrix substrate is substantially the same as that of the first embodiment, with the difference being the locations of the backup wires 38 and the shielding metal lines 32. In this embodiment, the backup wires 38, the gate electrode 341 and the gate lines 40 are fabricated at the same time, and formed from M1. The shielding metal lines 32 and the data lines 50 are fabricated at the same time, and formed from M2. The backup wires 38 and the shielding metal lines 32 are floating before repair.

For clear description, the shielding metal lines 32 adjacent to the defect in the data line $DL_2$ are referred to as 32a and 32b, and the protruding portions 38 for repair are referred to as 38a and 38b.

In order to ensure the fabrication quality of the active matrix substrate, disconnection defects in the data lines 50 are detected by, for example, observing the brightness of the pixel region 36. For example, the data line $DL_2$ between the gate lines $GL_2$ and $GL_3$ may be broken. To repair the broken data line $DL_2$, two nearby shielding metal lines 32a or/and 32b can be chosen. In this embodiment, the shielding metal line 32a is selected. Laser fusing is then executed on the repair points C, D, E and F to remove part of the insulating layer 42. Then, the data line $DL_2$ on M2 is electrically connected to the backup wires 38a and 38b on M1, and the shielding metal line 32a on M2 is also electrically connected to the backup wires 38a and 38b, as shown in FIG. 8B. Thus, this segment of the data line $DL_2$ can be replaced by the local repair line composed of the backup wire 38a, the shielding metal line 32a and the backup wire 38b, and the image signals can pass through the data line $DL_2$ by detouring around the broken terminals A and B.

Fourth Embodiment

Figure 9:
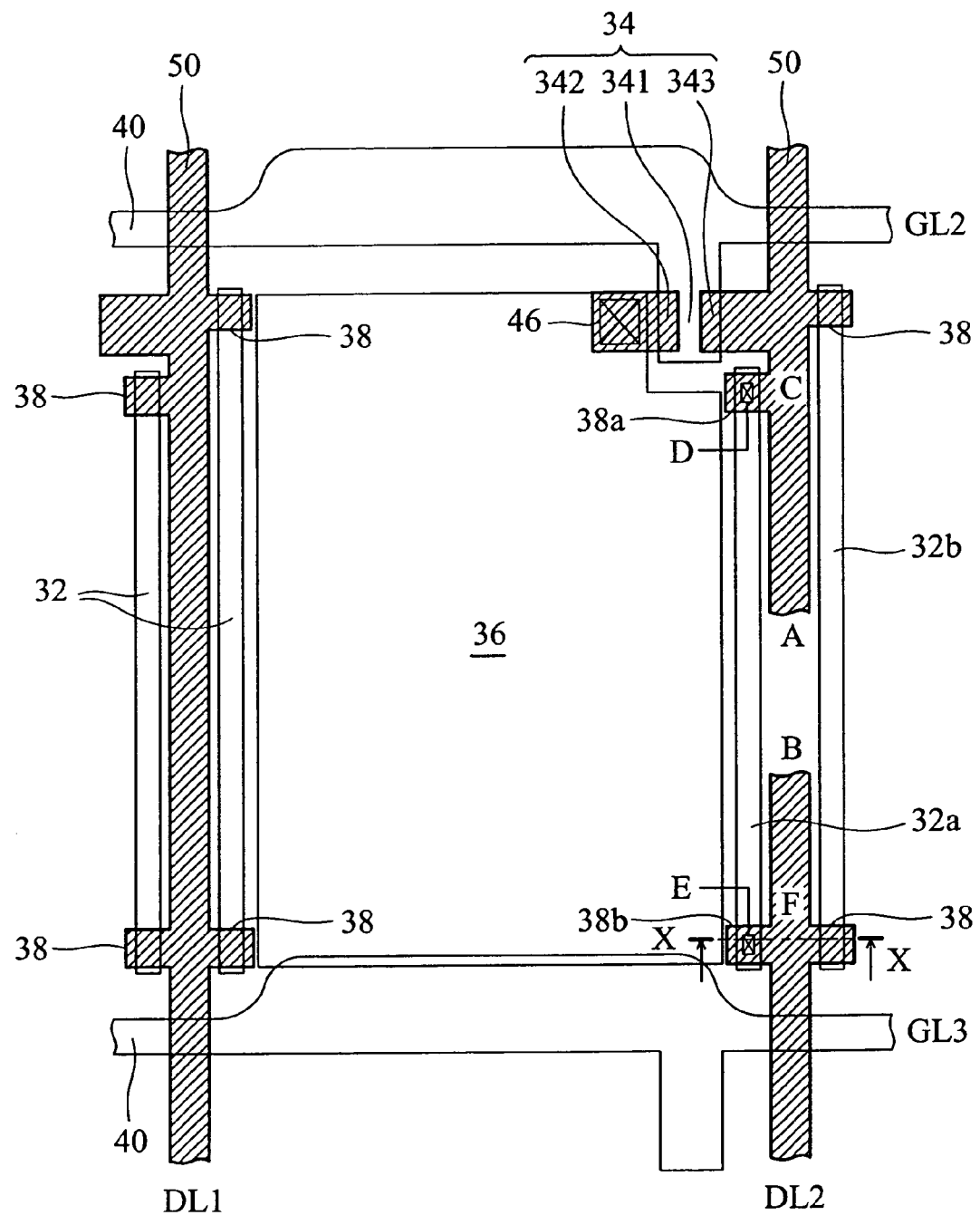
FIG. 9 is a top view of the pixel structure allowing repair of data line defects according to the fourth embodiment of the present invention.
Figure 10A:
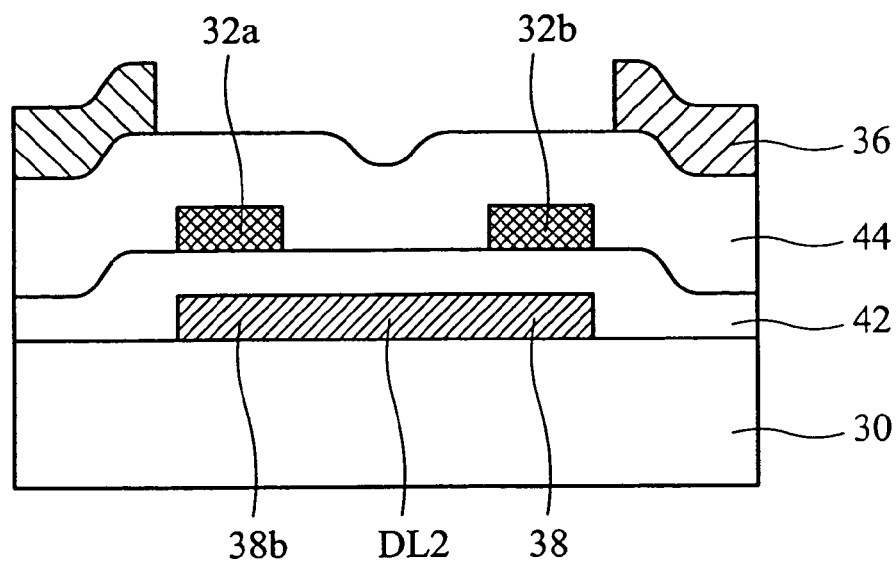
FIG. 10A is a cross section taken along cut line X—X of FIG. 9 before repair.
Figure 10B:
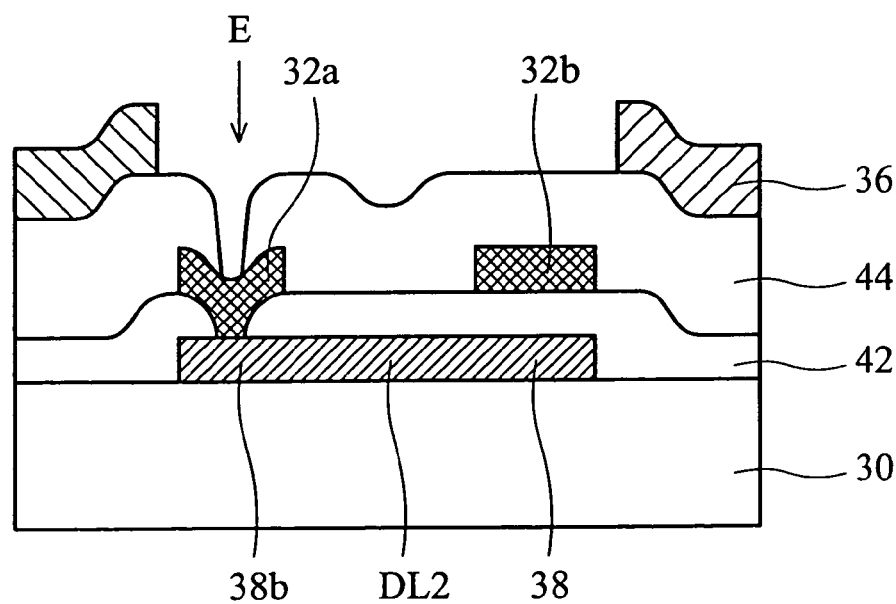
FIG. 10B is a cross section taken along cut line X—X of FIG. 9 after repair.

FIG. 9 is a top view of the pixel structure allowing repair of data line defects. FIG. 10A is a cross section taken along cut line X—X of FIG. 9 before repair, and FIG. 10B is a cross section taken along cut line X—X of FIG. 9 after repair.

As shown in FIGS. 9 and 10, a first metal layer (M1) is formed on a substrate 30, and patterned to form a drain electrode 342, a source electrode 343, two data lines 50 and backup wires 38. An insulating layer 42, at least one semiconductor layer (not shown) and a second metal layer (M2) are sequentially formed on the substrate 30 with the drain electrode 342, the source electrode 343, the data lines 50 and the backup wires 38 thereon. After defining the second metal layer (M2), two gate lines 40, a gate electrode 341 of the TFT structure 34, and shielding metal lines 32 are formed. The shielding metal lines 32 are disposed between the pixel electrode 36 and the data lines 50 to obstruct the light in the periphery of the pixel electrode 36 and between the pixel electrode 36 and the data lines 50, and the shielding metal lines 32 are floating. In this embodiment, the backup wires 38 are protruding portions of the data lines 50. A passivation layer and a conducting layer, such as indium tin oxide (ITO), are sequentially formed on the substrate 30 with the gate lines 40, the gate electrode 341 and the shielding metal line 32 thereon, and the conducting layer is patterned to form a pixel electrode 36. The pixel electrode 36 electrically connects the drain electrode 342 through the contact hole 46. The active matrix substrate is thus substantially obtained.

For clear description, the shielding metal lines 32 adjacent to the defect in the data line $DL_2$ are referred to as 32a and 32b, and the protruding portions 38 for repair are referred to as 38a and 38b.

In order to ensure the fabrication quality of the active matrix substrate, disconnection defects in the data lines 50 are detected by, for example, observing the brightness of the pixel region 36. For example, the data line $DL_2$ between the gate lines $GL_2$ and $GL_3$ may be broken. To repair the broken data line $DL_2$, two nearby shielding metal lines 32a or/and 32b can be chosen. In this embodiment, the shielding metal line 32a is selected. Laser fusing is then executed on the repair points D and E to remove part of the insulating layer 42. Then, the shielding metal lines 32a on M2 are electrically connected to the backup wires 38a and 38b on M1, as shown in FIG. 10B. Thus, this segment of the data line $DL_2$ can be replaced by the local repair line composed of the backup wire 38a, the shielding metal line 32a and the backup wire 38b, and the image signals can pass through the data line $DL_2$ by detouring around the broken terminals A and B.

In this embodiment, the backup wires 38 are fabricated with the data lines 50 and formed from M1. The shielding metal line 32 is fabricated with the gate 341 and the gate lines 40 and formed from M2. The backup wires 38 extend from the data lines 50, and laser fusing connects the backup wires 38, comprising the protruding portions of data line $DL_2$, with the above shielding metal line 32 to form the repair line detouring around the disconnection defect.

Fifth Embodiment

Figure 11:
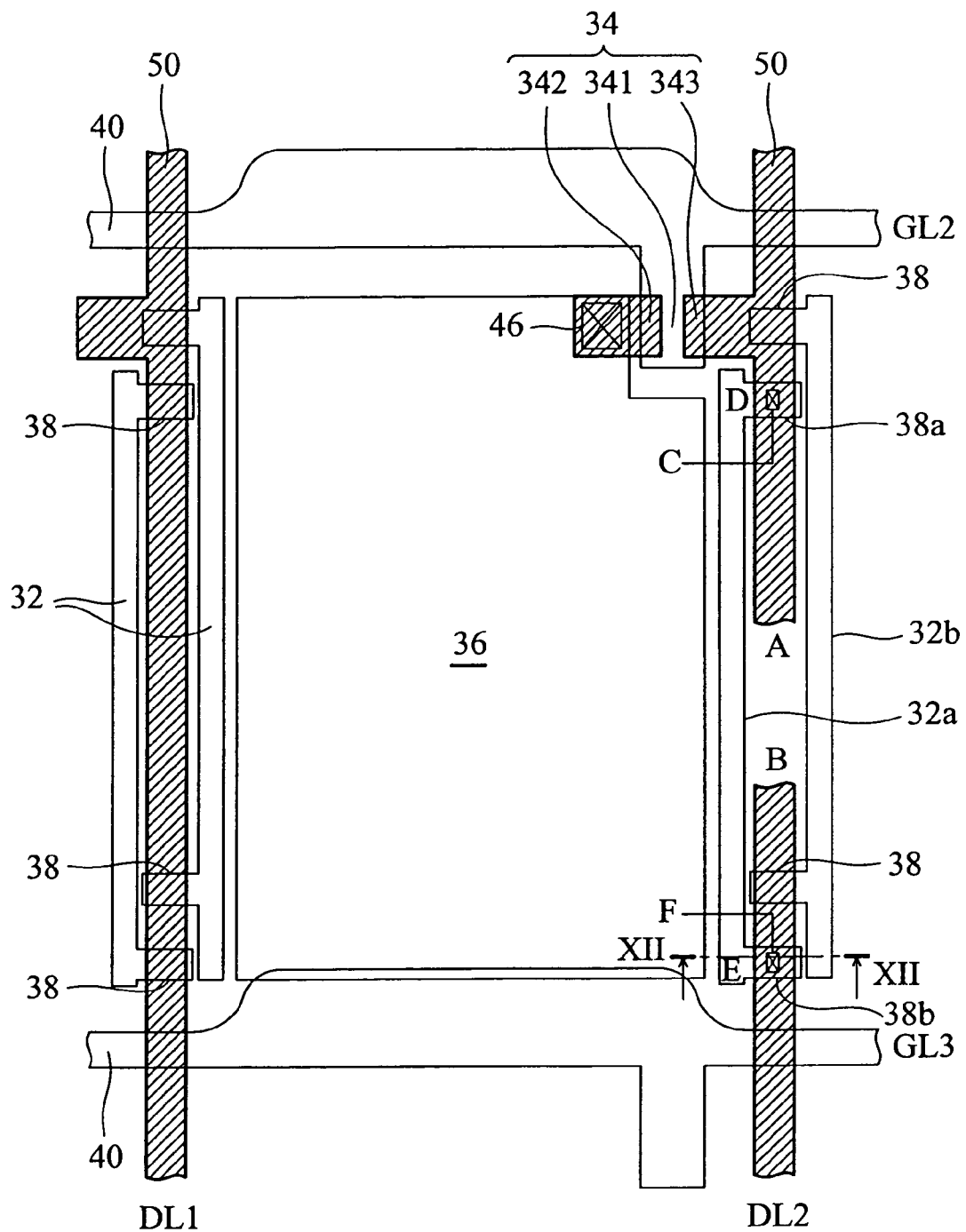
FIG. 11 is a top view of the pixel structure allowing repair of data line defects according to the fifth embodiment of the present invention.
Figure 12A:
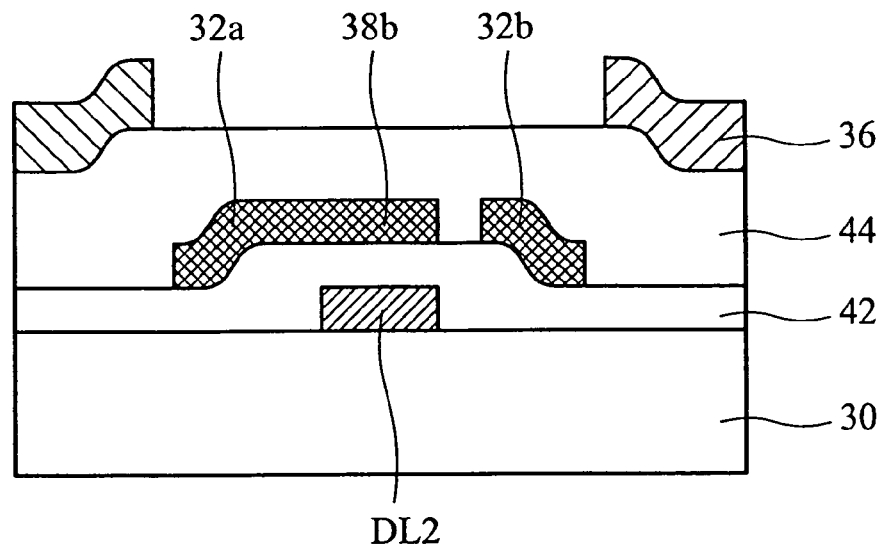
FIG. 12A is a cross section taken along cut line XII—XII of FIG. 11 before repair.
Figure 12B:
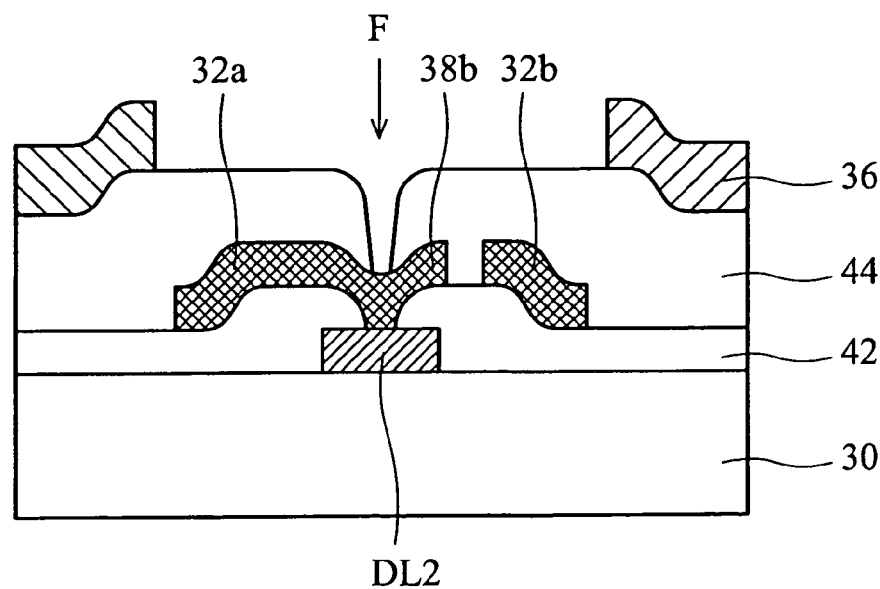
FIG. 12B is a cross section taken along cut line XII—XII of FIG. 11 after repair.

FIG. 11 is a top view of the pixel structure allowing repair of data line defects. FIG. 12A is a cross section taken along cut line XII—XII of FIG. 11 before repair, and FIG. 12B is a cross section taken along cut line XII—XII of FIG. 11 after repair.

In this embodiment, the fabrication process of the active matrix substrate is substantially the same as that of the fourth embodiment, with the difference being the location of the backup wires 38. In this embodiment, the backup wires 38, the shielding metal lines 32, the gate electrode 341 and the gate lines 40 are fabricated at the same time, and formed from M2. The data lines 50 are formed from M1. The backup wires 38 are the protruding portions of the shielding metal lines 32.

For clear description, the shielding metal lines 32 adjacent to the defect in the data line $DL_2$ are referred to as 32a and 32b, and the protruding portions 38 for repair are referred to as 38a and 38b.

In order to ensure the fabrication quality of the active matrix substrate, disconnection defects in the data lines 50 are detected by, for example, observing the brightness of the pixel region 36. For example, the data line $DL_2$ between the gate lines $GL_2$ and $GL_3$ may be broken. To repair the broken data line $DL_2$, two nearby shielding metal lines 32a or/and 32b can be chosen. In this embodiment, the shielding metal line 32a is selected. Laser fusing is then executed on the repair points C and F to remove part of the insulating layer 42. Then, the backup wires 38a and 38b on M2 are electrically connected to the data line $DL_2$ on M1, as shown in FIG. 12B. Thus, this segment of the data line $DL_2$ can be replaced by the local repair line composed of the backup wire 38a, the shielding metal line 32a and the backup wire 38b, and the image signals can pass through the data line $DL_2$ by detouring around the broken terminals A and B.

Sixth Embodiment

Figure 13:
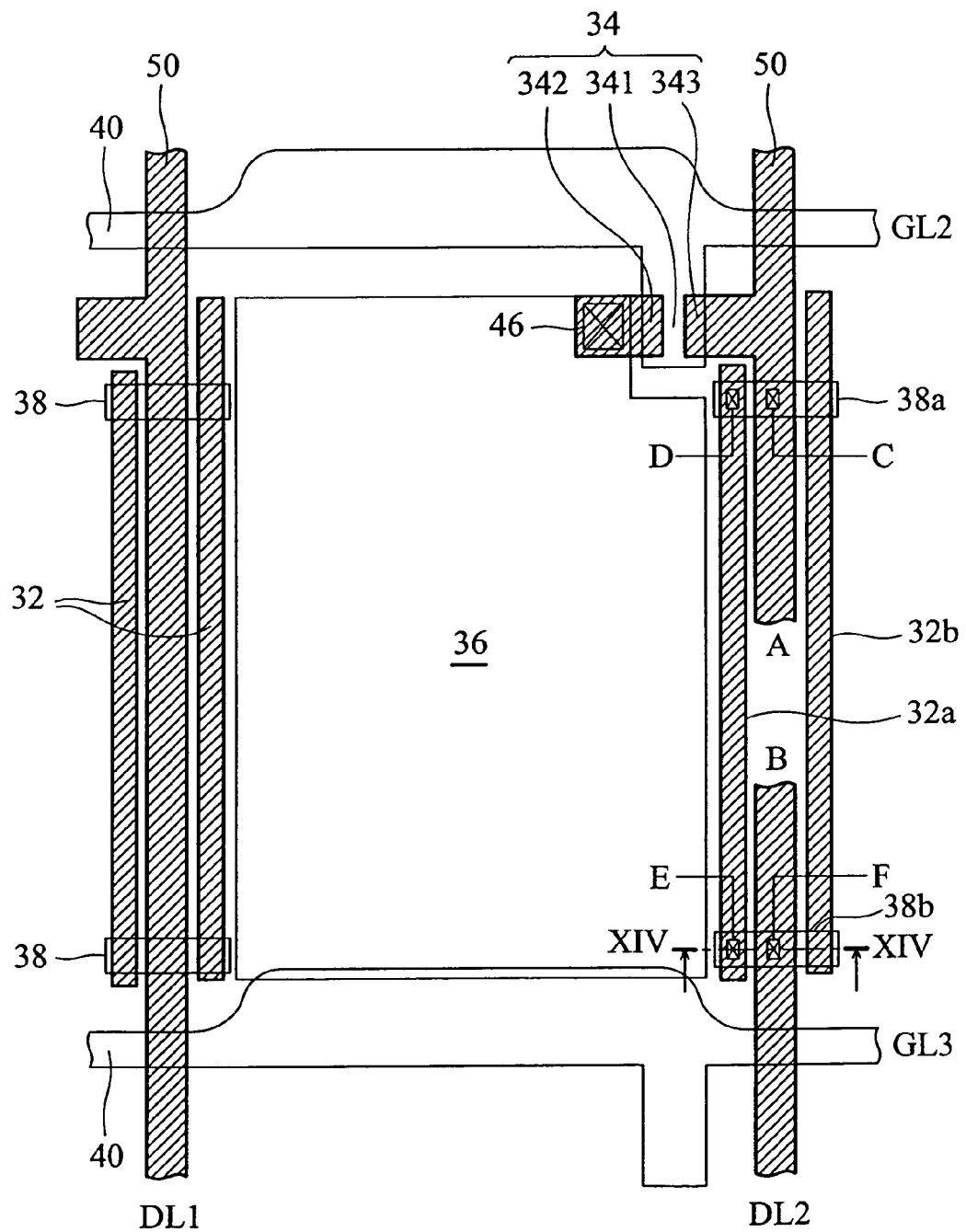
FIG. 13 is a top view of the pixel structure allowing repair of data line defects according to the sixth embodiment of the present invention.
Figure 14A:
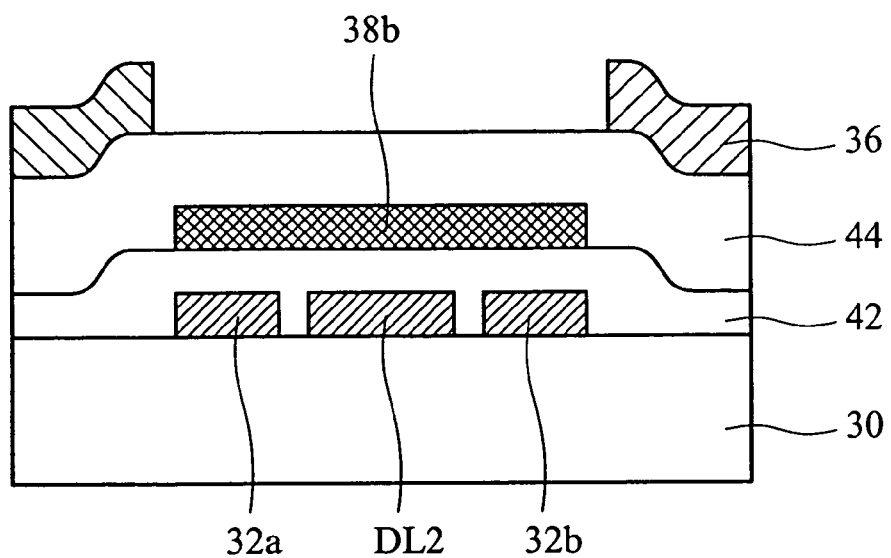
FIG. 14A is a cross section taken along cut line XIV—XIV of FIG. 13 before repair.
Figure 14B:
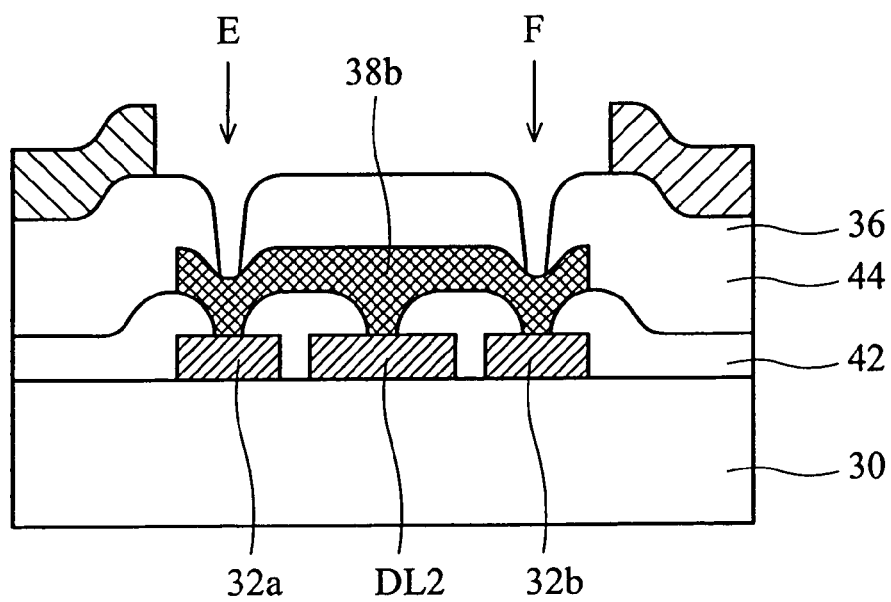
FIG. 14B is a cross section taken along cut line XIV—XIV of FIG. 13 after repair.

FIG. 13 is a top view of the pixel structure allowing repair of data line defects. FIG. 14A is a cross section taken along cut line XIV—XIV of FIG. 13 before-repair, and FIG. 14B is a cross section taken along cut line XIV—XIV of FIG. 13 after repair.

In this embodiment, the fabrication process of the active matrix substrate is substantially the same as that of the fourth embodiment, with the difference being the locations of the backup wires 38 and the shielding metal lines 32. In this embodiment, the backup wires 38, the gate electrode 341 and the gate lines 40 are fabricated at the same time, and formed from M2. The shielding metal lines 32 and the data lines 50 are fabricated at the same time, and formed from M1. The backup wires 38 and the shielding metal lines 32 are floating before repair.

For clear description, the shielding metal lines 32 adjacent to the defect in the data line $DL_2$ are referred to as 32a and 32b, and the protruding portions 38 for repair are referred to as 38a and 38b.

In order to ensure the fabrication quality of the active matrix substrate, disconnection defects in the data lines 50 are detected by, for example, observing the brightness of the pixel region 36. For example, the data line $DL_2$ between the gate lines $GL_2$ and $GL_3$ may be broken. To repair the broken data line $DL_2$, two nearby shielding metal lines 32a or/and 32b can be chosen. In this embodiment, the shielding metal line 32a is selected. Laser fusing is then executed on the repair points C, D, E and F to remove part of the insulating layer 42. Then, the backup wires 38a and 38b on M2 are electrically connected to the data line $DL_2$ on M1, and the backup wires 38a and 38b are also electrically connected to the shielding metal line 32a on M2, as shown in FIG. 14B. Thus, this segment of the data line $DL_2$ can be replaced by the local repair line composed of the backup wire 38a, the shielding metal line 32a and the backup wire 38b, and the image signals can pass through the data line $DL_2$ by detouring around the broken terminals A and B.

Seventh Embodiment

In the previous embodiments, each shielding metal line 32 has two corresponding backup wires 38 disposed substantially at two terminals of the shielding metal line 32. However, the number of the backup wires 38 is not limited to two; each shielding metal line 32 can also have three or more backup wires 38 so that the choices of repair are flexible.

Figure 15:
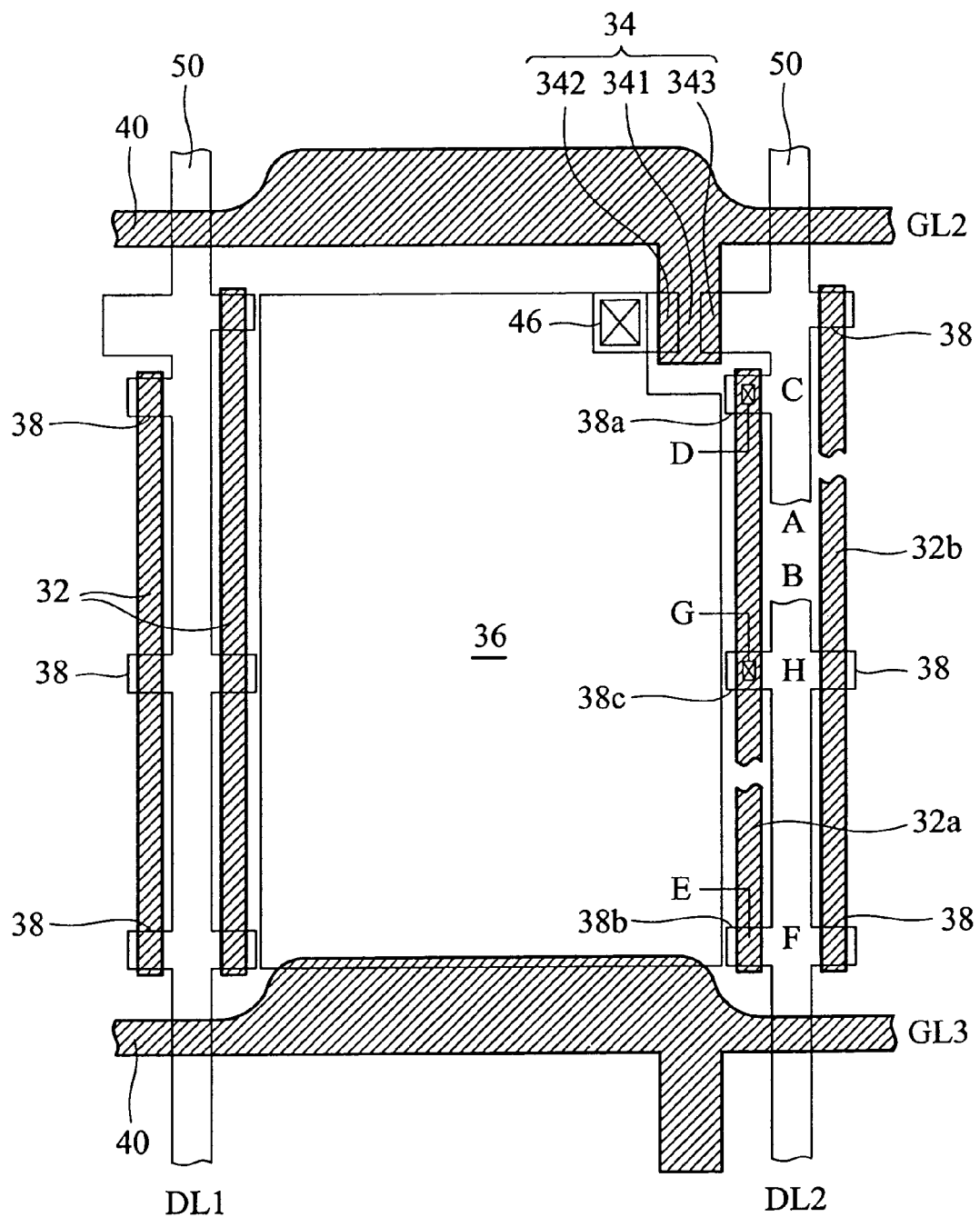
FIG. 15 is a top view of the pixel structure allowing repair of data line defects according to the seventh embodiment of the present invention, wherein each shielding metal line has three backup wires for repairing.

In FIG. 15, each shielding metal line 32 has three backup wires 38 using the fabrication process in the first embodiment as an example. In this embodiment, the shielding metal lines 32, the gate electrode 341 and the gate lines 40 are fabricated at the same time, and formed from M1. The backup wires 38 and the data lines 50 are fabricated at the same time, and formed from M2.

For clear description, the shielding metal lines 32 adjacent to the defect in the data line $DL_2$ are referred to as 32a and 32b, and the protruding portions 38 for repair are referred to as 38a and 38b.

In order to ensure the fabrication quality of the active matrix substrate, disconnection defects in the data lines 50 are detected by, for example, illumination of the pixel region 36. For example, the data line $DL_2$ between the gate lines $GL_2$ and $GL_3$ may be broken. To repair the broken data line $DL_2$, two nearby shielding metal lines 32a or/and 32b can be chosen. If, unfortunately, the two shielding metal lines 32a and 32b are also broken, it may be impossible to use whole shielding metal line 32a or/and 32b to repair it. As shown in FIG. 15, laser fusing is executed on the repair points D and G to connect the backup wires 38a and 38c on M2 with the shielding metal line 32a on M1. Thus, this segment of the data line $DL_2$ can be replaced by the local repair line composed of the backup wire 38a, the shielding metal line 32a and the backup wire 38c, that is, the circuit path of C D G H, and the image signals can pass through the data line $DL_2$ by detouring around the broken terminals A and B.

Figure 16:
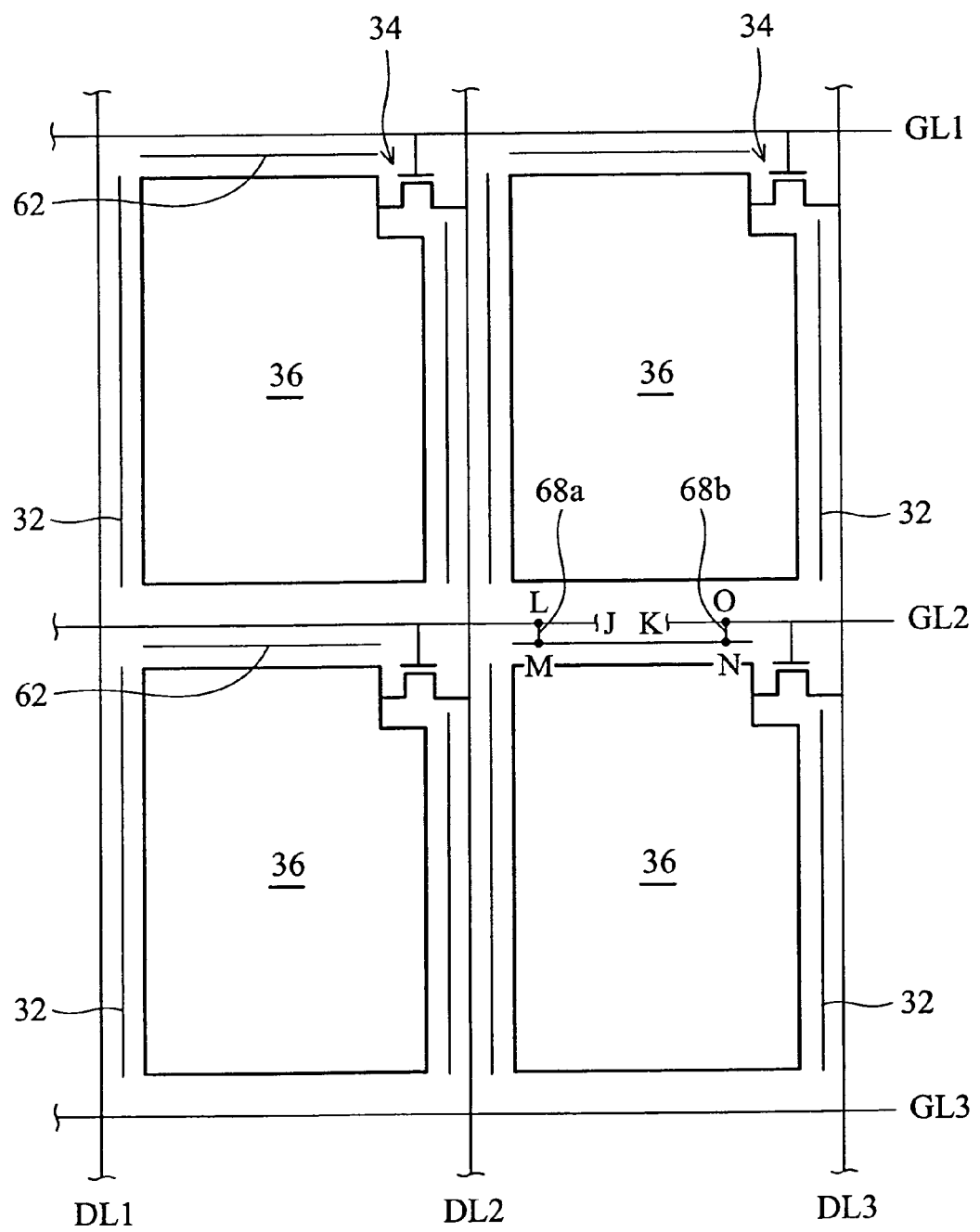
FIG. 16 is an equivalent circuit showing the repair method for disconnection defects in the gate line.

Repair Disconnection Defect in the Gate Line:

The above-mentioned repair method for data line defects is also suitable for gate lines. As shown in FIG. 16, the shielding metal lines 62 are disposed between the pixel electrode 36 and the gate lines 50 to obstruct the light leakage in the periphery of the pixel electrode 36.

For example, if the disconnection defect occurs between terminal J and K in the gate line $GL_2$, image signals cannot be transmitted in the gate line $GL_2$. The repair method connects the gate line GL2 with the shielding metal line 62 via the wires 68a and 68b to detour around the defect region. Thus, the electrically connecting path through the points L M N O serves a repair line that goes around the defect between the terminals A and B.

The backup wires 68a and 68b can extend from the gate line $GL_2$ or the shielding metal line 62 or be an independent wire. If the backup wires 68a and 68b extend from the gate line $GL_2$, the repair points are M and N. If the backup wires 68a and 68b extend from the shielding metal line 62, the repair points are L and O. If the backup wires 68a and 68b are independent wires, the repair points are M, N, L and O.

In the present invention, the shielding metal lines disposed beside the gate lines and the data lines and the backup wires across the gate/shielding metal lines and the data/shielding metal lines are set for repairing disconnection defects. If several defects occurred in the same data line and/or gate line, each can be repaired by laser fusing using the adjacent, suitable shielding metal line and the corresponding backup wires to detour around the defect to become an electrical loop. Thus, the number of the repair line is not limited by the space and size of the LCD, and the resistance and capacitance of the repair line are maintained, avoiding RC delay.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as detected by the appended claims when interpreted in accordance with the breadth to which they are fairly, legally, and equitably entitled.

What is claimed is:

1. A flat panel display allowing repair of data line defects, comprising:

a plurality of gate lines and a plurality of data lines intersecting to define a plurality of pixel regions;

a plurality of pixel electrodes disposed in the pixel regions respectively;

a plurality of first shielding metal lines disposed between the pixel electrodes and the data lines in the pixel regions respectively, each first shielding metal line separated from the others; and at least two first backup wires across the adjacent first shielding metal line and data line, wherein the first backup wires are isolated from the data lines or the first shielding metal lines or isolated from both of them;

wherein the first shielding metal lines and the gate lines are in a first metal layer, and the first backup wires and the data lines are in a second metal layer.

2. The flat panel display of claim 1, wherein the first backup wires extend from the data lines.

3. The flat panel display of claim 2, wherein a plurality of overlap points of the first backup wires and the first shielding metal lines act as a plurality of repair points.

4. A flat panel display allowing repair of data line defects, comprising:

a plurality of gate lines and a plurality of data lines intersecting to define a plurality of pixel regions;

a plurality of pixel electrodes disposed in the pixel regions respectively;

a plurality of first shielding metal lines disposed between the pixel electrodes and the data lines in the pixel regions respectively, each first shielding metal line separated from the others; and at least two first backup wires across the adjacent first shielding metal line and data line, wherein the first backup wires are isolated from the data lines or the first shielding metal lines or isolated from both of them;

wherein the first backup wires and the data lines are in a first metal layer, and the first shielding metal lines and the gate lines are in a second metal layer.

5. The flat panel display of claim 1, wherein the first backup wires extend from the first shielding metal lines.

6. The flat panel display of claim 5, wherein a plurality of overlap points of the first backup wires and the data lines act as a plurality of repair points.

7. A flat panel display allowing repair of data line defects, comprising:

a plurality of gate lines and a plurality of data lines intersecting to define a plurality of pixel regions;

a plurality of pixel electrodes disposed in the pixel regions respectively;

a plurality of first shielding metal lines disposed between the pixel electrodes and the data lines in the pixel regions respectively, each first shielding metal line separated from the others; and at least two first backup wires across the adjacent first shielding metal line and data line, wherein the first backup wires are isolated from the data lines or the first shielding metal lines or isolated from both of them;

wherein the first backup wires, the first shielding metal lines and the gate lines are in a first metal layer, and the data lines are in a second metal layer.

8. A flat panel display allowing repair of data line defects, comprising:

a plurality of gate lines and a plurality of data lines intersecting to define a plurality of pixel regions;

a plurality of pixel electrodes disposed in the pixel regions respectively;

a plurality of first shielding metal lines disposed between the pixel electrodes and the data lines in the pixel regions respectively, each first shielding metal line separated from the others; and at least two first backup wires across the adjacent first shielding metal line and data line, wherein the first backup wires are isolated from the data lines or the first shielding metal lines or isolated from both of them;

wherein the data lines are in a first metal layer, and the first backup wires, the first shielding metal lines and the gate lines are in a second metal layer.

9. A flat panel display allowing repair of data line defects, comprising:

a plurality of gate lines and a plurality of data lines intersecting to define a plurality of pixel regions;

a plurality of pixel electrodes disposed in the pixel regions respectively;

a plurality of first shielding metal lines disposed between the pixel electrodes and the data lines in the pixel regions respectively, each first shielding metal line separated from the others; and at least two first backup wires across the adjacent first shielding metal line and data line, wherein the first backup wires are isolated from the data lines or the first shielding metal lines or isolated from both of them;

wherein the first backup wires are isolated from the data lines and the first shielding metal layer.

10. The flat panel display of claim 9, wherein a plurality of overlap points of the first backup wires, the data lines, and the first shielding metal lines act as a plurality of repair points.

11. The flat panel display of claim 9, wherein the first backup wires and the gate lines are in a first metal layer, and the first shielding metal layer and the data lines are in a second metal layer.

12. The flat panel display of claim 9, wherein the first shielding metal layer and the data lines are in a first metal layer, and the first backup wires and the gate lines are in a second metal layer.

13. A flat panel display allowing repair of data line defects, comprising:

a plurality of gate lines and a plurality of data lines intersecting to define a plurality of pixel regions;

a plurality of pixel electrodes disposed in the pixel regions respectively;

a plurality of first shielding metal lines disposed between the pixel electrodes and the data lines in the pixel regions respectively, each first shielding metal line separated from the others;

at least two first backup wires across the adjacent first shielding metal line and data line, wherein the first backup wires are isolated from the data lines or the first shielding metal lines or isolated from both of them;

a plurality of second shielding metal lines disposed between the pixel electrodes and the gate lines in the pixel regions respectively, each first shielding metal line separated from the others; and at least two second backup wires across the adjacent second shielding metal line and gate line;

wherein the second backup wires are isolated from the gate lines and the second shielding metal layer.

14. The flat panel display of claim 13, wherein the second backup wires extend from the gate lines.

15. The flat panel display of claim 14, wherein a plurality of overlap points of the second backup wires and the second shielding metal lines act as a plurality of repair points.

16. The flat panel display of claim 13, wherein the second backup wires extend from the second shielding metal lines.

17. The flat panel display of claim 16, wherein a plurality of overlap points of the second backup wires and the gate lines act as a plurality of repair points.

18. The flat panel display of claim 13, wherein a plurality of overlap points of the second backup wires, the gate lines, and the second shielding metal lines act as a plurality of repair points.

* * * * *